United States Patent [19]

Persen

[11] Patent Number: 4,622,507

[45] Date of Patent: Nov. 11, 1986

[54] INTEGRATED BATTERY AND RECHARGER

[76] Inventor: David Persen, P.O. Box 1526, San Mateo, Calif. 94401

[21] Appl. No.: 697,157

[22] Filed: Feb. 1, 1985

[51] Int. Cl.⁴ .......................................... H01M 10/46
[52] U.S. Cl. .......................................... 320/2; 429/9
[58] Field of Search .................... 320/2; 362/183, 194, 362/195; 429/9, 99, 100

[56] References Cited

U.S. PATENT DOCUMENTS 3,533,119  10/1970  Dokos ............................... 320/2 X
4,086,523   4/1978  Izumi ................................... 320/2

Primary Examiner—Patrick R. Salce
Assistant Examiner—Mark D. Simpson
Attorney, Agent, or Firm—M. Reid Russell

[57] ABSTRACT

An integrated battery and recharger that consists of a single casing wherein both a voltage storage cell and a circuit for charging that storage cell are arranged and includes a removable head for attachment to that casing. The assemblage to have the dimensions of a standard "C" cell battery and larger, which head when positioned to the casing in one attitude provides for connection of a positive pole formed in that head to one side of the storage cell, with a battery negative pole connected to the other side of the storage cell, and, when the head is repositioned to its other attitude to the casing, a pair of blades that extend therefrom and are for fitting into a standard household current receptacle, are connected across the charging circuit to charge the storage cell, in which charging attitude the electrical connection to the battery negative pole is broken.

18 Claims, 5 Drawing Figures

INTEGRATED BATTERY AND RECHARGER

BACKGROUND OF THE INVENTION

1. Field of the Invention

The present invention relates to rechargeable batteries as for example, a nickel-cadmium cell battery, and chargers therefor.

2. Prior Art

In recent years, rechargeable battery operated devices have become more and more commonplace and today are used in such devices as hand tools, vacuum cleaners, flashlights, and numerous others. Such devices usually utilize "secondary cells" as for example a nickel-cadmium cell that, when its potential is depleted, can be recharged or regenerated through application of an electrical current in the direction opposite to the cells discharge flow path. Charging periods for such secondary cells can vary with the circuits employed.

The present invention is an improvement on an earlier patent issued to the inventor on a combination battery and recharger, U.S. Pat. No. 3,360,708. This patent provided, as separate units, a rechargeable battery cell and a recharging circuit therefor and for alternatively coupling the two components. In one coupled arrangement, the unit is to function as a battery, and in the other arrangement, the unit is to be plugged into a standard wall socket, connecting a charging circuit to recharge the battery cell. The present invention, significantly different therefrom eliminates the two separate housings and includes both the nickel-cadmium cell and charger unit within a single housing. The invention further includes a single coupling head for alternative arrangement to the single housing to connect the cell as a battery, or for plugging into a conventional electrical socket to connect the nickel-cadmium cell to a standard electrical current for recharging. Additionally, where the earlier charger and battery were separate units and the one could easily be separated from the other, the present invention, provides a releasable stud end and/or socket type connector for locking the coupling head to the single housing top.

The present invention improves upon the circuitry set out as preferred in the earlier patent by utilizing an inexpensive and efficient capacitance circuit. This circuit provides for coupling the charging circuit to the nickel-cadmium cell during both charging and discharging, and includes a unique disconnect arrangement for isolating the battery base (negative pole) during charging. The circuit arrangement provides an efficient charger circuit that is inexpensive to produce, is superior to the earlier utilized resistance circuit and is therefore a significant improvement.

SUMMARY OF THE INVENTION

It is the principal object of the present invention to provide an integrated secondary cell and charger circuit as a battery and charger therefor arranged in a single casing or housing.

It is another object of the present invention to provide an arrangement of a rechargeable secondary cell and recharger circuit for containment within a single casing or housing of the size of a standard "C" size battery, or larger.

It is another object to provide a simple and inexpensive capacitance and diode bridge circuit for full wave rectification charging a secondary cell with that capacitance circuit remaining connected to the secondary cells during both charging and discharging, the invention providing for disconnecting the battery base or negative pole from the circuit during charging to avoid a hazard of electrical shock.

It is another object of the present invention to provide, with the integrated battery and charger, a removable coupling head with blades on one face thereof for fitting into a standard wall receptacle passing current to the recharger circuit, and on the other head face, a center positive terminal connected to the secondary cell to function as the battery positive pole.

Another object of the present invention is to provide, a fastener arrangement to releasably couple the coupling head to that casing.

Another object of the present invention is to provide an integrated battery and charger circuit therefor that is inexpensive to construct, is safe and reliable, and will not present an electrical shock hazard at the battery base or negative pole when the unit is arranged in a recharging mode.

In accordance with the above objects, the present invention is in a rechargeable battery commonly for use in flashlights, toys, and the like. The unit is contained within a single housing or casing of the dimensions of a standard "C", "D" cell, or other standard battery configurations, and includes a nickel-cadmium cell and charger circuit. The preferred charging circuit is a capacitance circuit with a diode bridge for achieving full wave rectification. The capacitor is connected to the battery cell through a diode bridge or a like arrangement of discrete diodes, and the invention involves an arrangement for disconnecting the battery base or negative pole from the circuit when in the charging mode eliminating an electrical shock hazard. The capacitance circuit provides an inexpensive, compact, and safe charging circuit for low current charging operation.

To provide for disconnection of the battery casing base or negative pole from the circuit when the battery is in a recharging mode, the invention includes a conductive bar fitted within the casing along the interior wall extending top to bottom. The bar is connected on one end to the casing base, with the other end arranged for contact by one of the pair of blades that extend outwardly from one face of a connecting head that will contact also a plate to complete an electrical connection to the nickel-cadmium cell. The connecting head is a separate unit, and includes the pair of blades projecting outwardly from one face with a centered positive pole projecting from the opposite face. The connecting head is arranged to receive connector pins that: selectively connect the blades to pass current through the charging circuit to the nickel-cadmium cell during charging; and connect the positive pole to that nickel-cadmium cell when the connecting head is rotated through one hundred eighty degrees (180°) around its longitudinal axis. With the connecting head positioned such that the positive pole projects outwardly, the pair of blades are fitted through the top, traveling within the casing, with one of the pair of blades to contact the conductive bar and a plate within the housing, electrically connecting the casing base (the battery negative pole) to the nickel-cadmium cell.

The connecting head that includes the outwardly projecting pair of blades on one face with the positive pole projecting from the opposite parallel face for the larger "D" cell battery is preferably elliptical in shape and for the smaller batteries such as a "C" cell may be of another convenient shape. The head for each particular battery is to be installed off-center of the casing longitudinal axis to nest against a shoulder or segment of the casing top providing a level surface across that installed head and shoulder top. Said shoulder for the "D" cell is preferably an arcuate or half moon shape. Thereby, casing connector pins that project from the casing top can be appropriately fitted into contacts in the connecting head. In one connecting head attitude the positive pole extends outwardly and is centered relative to the casing longitudinal axis. In this attitude the pair of blades are fitted into slots in the casing top to extend into the casing with one of the blades contacting both a conductive bar and plate to complete an electrical connection to the casing base or negative pole to the cell. In the other attitude, the connecting head is rotated one hundred eighty degrees (180°) around the axis of the ellipse, its longitudinal axis, and the pins appropriately plugged into the contacts. So arranged, the blades extend outwardly from the casing top.

The described off-center head arrangement frees space within that casing where battery and charger components can be arranged. The assembled integral battery and recharger components will thereby fit within the single casing to have a diameter and height of as small as a standard "C" cell battery.

Additionally, the present invention, to prohibit separation and loss of the connecting head from the casing, provides a socket arrangement and/or a detent and and receptacle system between the connecting head and casing lock for releasably locking that head thereto.

BRIEF DESCRIPTION OF THE DRAWINGS

These and other objects will appear in the following detailed description in which preferred embodiments have been described in detail in conjunction with the accompanying drawings.

DETAILED DESCRIPTION

Figures 1, 2:
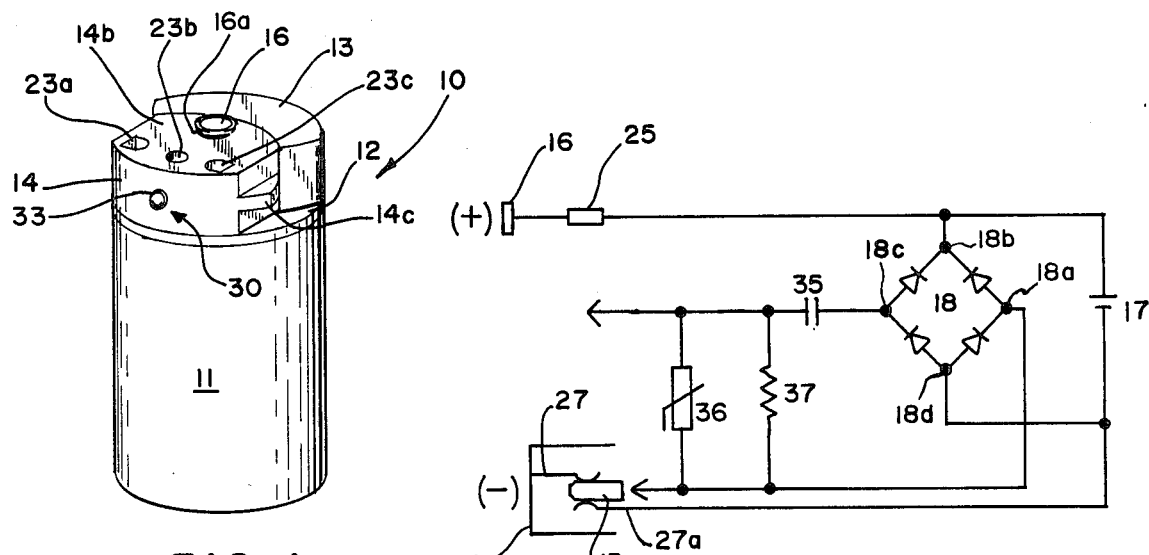
FIG. 1, is a side elevation view of an integrated battery and recharger of the present invention shown configured as a conventional "D" cell size battery.
FIG. 2 shows a schematic of a charging circuit and nickel-cadmium cell configured to function as the battery of FIG. 1.

Referring now to the drawings:

In FIG. 1 is shown a preferred embodiment of an integrated battery and recharger of the present invention hereinafter referred to as battery 10. Shown therein the battery 10 is configured as a standard "D" cell size battery for use in a flashlight, toy, or the like, though it should also be understood, that this arrangement could be employed for other sizes of batteries, to include "C" cell or a standard nine volt battery. For purposes of this disclosure, however, the battery 10 will be described relative to its arrangement as a standard "D" cell size battery.

In FIG. 1, the battery 10 is shown to include a cylindrical casing 11 that is preferably formed from a nonconductive material, such as a plastic, and includes a casing top 12. The casing top is also preferably formed from a nonconductive material, such as a plastic for closing over an open top end of casing 11. Shown in FIGS. 1, 3, and 5, the top 12 includes an upstanding hollow arcuate shoulder or section 13 that is positioned such that a convex curved side is aligned with a portion of the top edge as an extension thereof. Another concave curved side thereof is arranged across that shoulder from the convex side to accommodate a connecting head 14, hereinafter referred to as head, nested or fitted thereagainst. The head and shoulder form a disk shaped upper end presenting a flat surface thereacross as the battery top. The height of which disk and casing will be equal to the length of a standard "D" cell size battery. The top 12, as shown best in FIG. 5, includes a top face that extends across the casing at essentially a normal angle from the base of the arcuate shoulder 13 and includes pins 20, 21, and 22 and blade slots 28a and 28b therewith whose function will be explained in detail herein below. The arcuate shoulder 13, it should be understood, is preferably open to the casing 11 interior, to receive battery components, such as wires and/or other circuit components not shown, fitted therein, as needed.

Figures 3, 4:
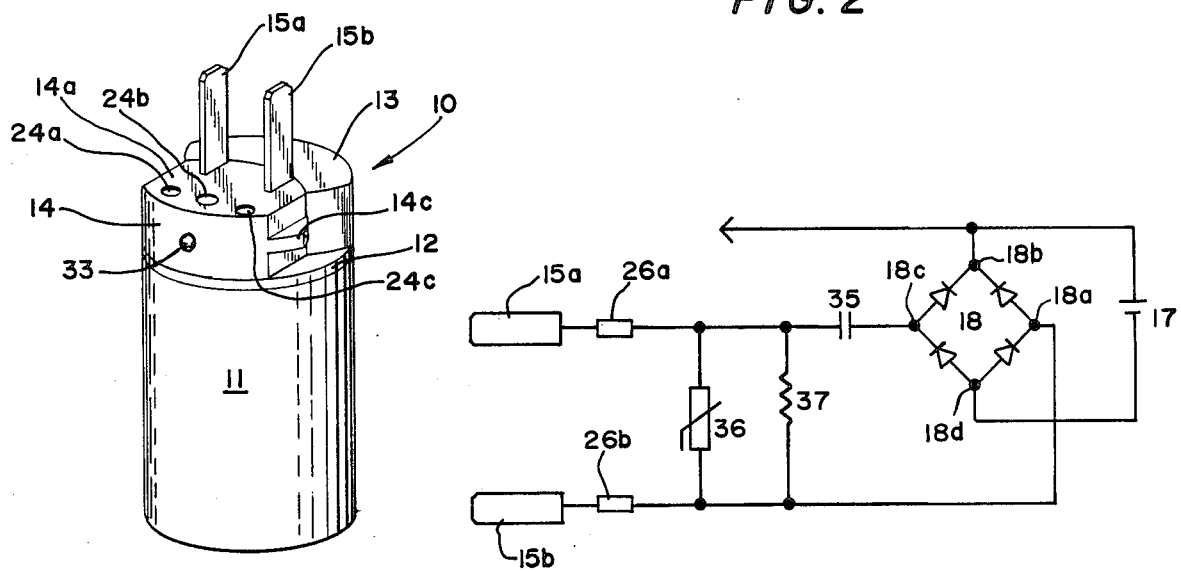
FIG. 3 shows a view like that of FIG. 1 except that the assembly is configured in a recharging mode, a removable connecting head thereof having been rotated around its longitudinal axis through a full one hundred eighty degrees (180°) and repositioned to the battery top such that a pair of blades extending from a head face will extend vertically therefrom for plugging into a conventional electrical wall socket.
FIG. 4 shows the schematic of the charging circuit and nickel-cadmium cell of FIG. 2 configured to receive a current from the pair of blades for full wave rectification to charge the nickel-cadmium cell.
Figure 5:
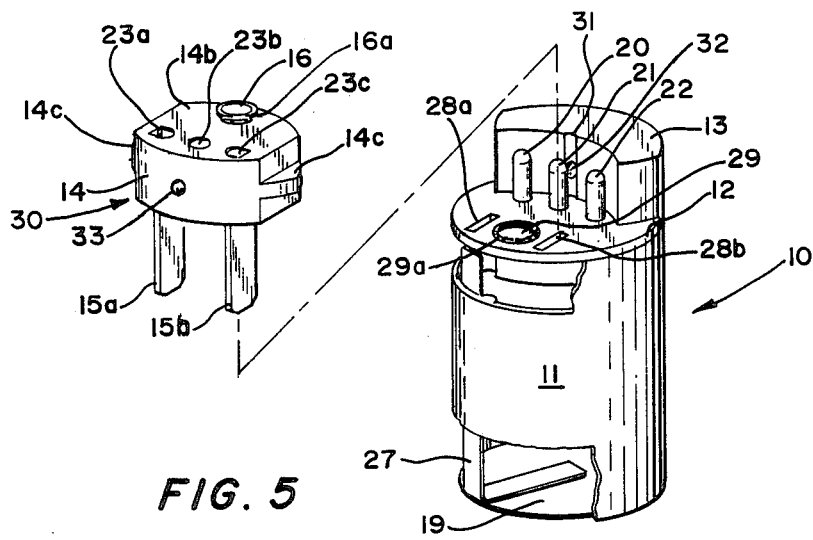
FIG. 5 shows a view like that of FIG. 1, only showing the connecting head disengaged from the casing top with sections of the casing broken away.

The head 14 as shown in FIGS. 1, 3, and 5 is preferably formed as an elliptical disk, opposite faces 14a and 14b thereof parallel to one another, each ellipse side to fit into the curve of the arcuate shoulder concave inner side. For battery configurations other than a "D" cell, the head may be arranged to have a different shape, within the scope of this disclosure. The head 14, as described above, is thereby off-set relative to the longitudinal center of the casing when fitted thereon, and includes on face 14a a pair of blades 15a and 15b that are parallel to one another and extend outwardly at a normal angle from that face, and includes a positive pole 16 arranged in the opposite head face 14b, extending therefrom whose function will be set out in detail later herein. When the battery 10 is configured as shown in FIG. 1, the blades 15a and 15b are fitted within slots 28a and 28b, extending vertically into and along the casing interior wall so as to provide minimum disruption of the space available within that casing interior so as to accommodate the battery and recharger components fitted therein. This blade placement arrangement makes possible the inclusion of both a nickel-cadmium cell 17 and a charger circuit in the single casing. Shown in FIG. 3, the blades 15a and 15b are arranged on face 14a of head 14 to extend vertically for installation in a standard electrical outlet receptacle for connecting the charger circuit as illustrated in the schematics of FIG. 4, to a standard house current. The charger circuit will provide a full wave rectification to charge the nickel-cadmium cell 17, as will be described in detail later herein.

FIG. 1 shows the head 14 arranged in the battery mode, the positive terminal 16 centered relative to the co-planar surfaces of the head face 14b and top of arcuate segment 13. In this configuration, as shown in the electrical schematic of FIG. 2, the positive pole 16 is electrically connected to a junction 18b of bridge 18 and the positive side of the nickel-cadmium cell 17, that is shown as a battery symbol, with the other side of the battery connected to an opposite junction 18d of a diode bridge 18, that is hereinafter referred to as bridge. The battery negative side is connected also to the bridge between junctions 18a and 18d across one of the diodes to battery negative pole 19. Bridge 18 functioning will be described in detail later herein and, although such arrangement is preferred, it should be understood that the function of diode bridge 18 can be performed by other circuitry arrangements such as an arrangement of discrete diodes, or the like, within the scope of this disclosure. Shown in FIG. 2, a contact 27a that connects to the negative side of secondary cell 17 is aligned with a blade slot 28a shown in FIG. 5 located in top 12 such that, when blade 15a is installed therein that blade will intersect and electrically connect the plate 27a to a conductive bar 27 that extends the length of the casing and connects to the battery negative pole or base 19. In FIG. 5, the blade slot 28a is shown above and aligned with the conductive bar 27. The conductive bar 27 is, in turn, shown resting on top of base 19, with both conductive bar and base fabricated from an electrically conductive material. So arranged, fitting of blade 15a into blade slot 28a, as shown in FIG. 2, completes an electrical circuit between plate 27a, conductive bar 27 and base 19 that is the battery negative pole.

FIGS. 1 and 3 show the alternative configurations of the battery 10. FIG. 1, is discussed above in conjunction with the circuit of FIG. 2, and FIG. 3 shows the battery 10 with the blades 15a and 15b extending outwardly from the battery top, arranged for installation into a standard wall receptacle, the circuit thereof shown in FIG. 4, as discussion in more detail hereinbelow.

In FIG. 5 head 14 is shown separated from top 12. The head includes blades 15a and 15b arranged to extend from proximate to one side of one head face 14a with the positive pole 16 shown extending above the level of the opposite head face 14b which head faces 14a and 14b are parallel to one another. So arranged, a rotation of the head 14, through one hundred and eighty degrees (180°) around its longitudinal axis and fitting the head to the top, with the pole 16 fitted into depression 29, results in centering the blades 15a and 15b with respect to top 12. Head 14, shown in FIG. 5, includes the flat parallel faces 14a and 14b that intersect at right angles to the elliptical shaped sides. The opposite ends of that elliptically shaped head are preferably contoured to facilitate a person fitting his fingers thereunder. In the preferred configuration, the head is machined, or otherwise formed, to leave pointed center remainder sections or portions 14c for gripping or fitting a person's fingers thereunder to lift the head off from the top 12 face. Removal of head 14, as shown in FIG. 5, express pins 20, 21, and 22 that extend vertically upwardly from the surface of the top face, arranged in approximately a straight line across the center thereof. Each of the pins 20, 21, and 22 is for electrically connecting either the head blades 15a and 15b or positive pole 16, into the circuits of the schematics of FIGS. 2 and 4, respectively. The head 14, to receive pins 20, 21, 22, includes complementary holes formed in the respective opposite head faces 14a and 14b. The respective holes are 23a, 23b, and 23c in face 14b and holes 24a, 24b, and 24c in face 14a. The holes selectively include appropriate electrically conductive connectors or sleeves fitted therein for making selective electrical connection with, respectively, the blades 15a and 15b and positive pole 16. Specifically, as shown in the schematic of FIG. 2, positive pole 16 is connected electrically, through a connector 25 that is arranged in hole 24b and receives pole 21 fitted therein, to connect to the positive side of the nickel-cadmium cell 17. The blades 15a and 15b, in turn, as shown in FIG. 4, connect through connectors 26a and 26b that are installed in holes 23a and 23c to receive pins 20 and 22 therein for making electrical connection across a charging circuit to opposite junctions 18a and 18c of bridge 18. FIG. 2, as described above, shows the blade 15a as electrically coupling the plate 27a, conductive bar 27 and battery base 19 to the negative side of secondary cell 17 through bridge junctions 18a and 18d. This coupling is, of course, broken when the blade 15a is removed from blade slot 28a when the head is arranged as shown in FIG. 3. Disconnecting the battery base 19 during charging removes any electrical shock hazard as could exist if the base 19 remained in the circuit during charging. The conductive bar 27, as shown in FIG. 5, extends the length of the interior wall of casing 11, the blade 15a completing that electrical connection between it and plate 27a that is installed in top 12, as illustrated in FIG. 2. With the battery arranged as shown in FIG. 1, the other blade 15b in slot 28b is isolated from the circuit components.

The invention preferably includes a coupling arrangement for maintaining the head 14 to top 12. One embodiment of such coupling arrangement includes, for fitting within the depression 29, a friction lock ring or collar 29a, that is preferably formed of brass or a like resilient material to have a diameter to fit within that depression and is formed to include a number of vertical sections that are bent upon themselves to extend below the top 12 surface, said sections to individually flex away from the depression center when so urged. The depression 29 containing the spring lock is to receive the positive pole 16 therein, which pole is formed to have a diameter slightly larger than the diameter of the friction lock collar, across the vertical section bends. So arranged, insertion of the pole 16 into the spring lock collar 29a spreads the sections thereof that flex apart, the ends thereof contacting a groove 16a formed circumferentially around the pole 16. A positive locking is thereby provided between the post 16 and friction lock collar 29a.

Alternatively, or in addition to the above set out coupling arrangement, the battery can include, as shown best in FIGS. 1, 3 and 5, as a coupling arrangement 30 detents 33, arranged across from one another in the head side extending from that head side and oppositely to one another. To receive a detent 33 end, the arcuate shoulder 13 is provided with a shallow track 31 that, as shown in FIG. 5, extends vertically across the concave portion thereof, the track leading to an opening or hole 32 wherein the detent end will come to rest. The detent 33 end can be spring biased or formed to compress slightly to ride along the track 31. The track, at the junction with the shoulder 13, is preferably bevelled or sloped appropriately to compress the detent as is the lip area around the hole 32.

In practice, in an embodiment that incorporates both of the above described head locking arrangements, the head 14, when in the battery charger mode as shown in FIG. 3, is positioned with the post 16 fitted into the friction locking collar 29a with, the one detent 33 fitted into hole 32. To reposition the head for the battery 10 to function as shown in FIG. 1, the head is lifted such that the post 16 is pulled out of the friction locking collar 29a and the one detent 33 compressed in track 31. Thereafter the head is slid along and off of pins 20, 21 and 22. When removed, the head is rotated around its longitudinal axis and is reinstalled onto the top 12, the head poles 24a, 24b and 24c traveling over pins 20, 21 and 22, the other detent 33 compressed to travel along track 31 to extend into hole 32. So arranged, the post 16 projects outwardly.

While preferred coupling arrangements have been set out hereinabove as used together, it should be obvious that they are independent arrangements and could also be employed separately. Also, it should be understood that other coupling arrangements could be so employed within the scope of this disclosure, one such arrangement, not shown, could be a leaf secured to the top to extend vertically from the edge thereof, parallel to the arcuate section. The leaf end thereof flanged inwardly towards the arcuate section for extending over an edge of the head. So arranged, the leaf would flex away from the head edge providing for its installation and removal, or other like coupling arrangement could be so employed.

FIGS. 2 and 4 show the preferred circuit configuration of the present invention as including both a charger circuit and its connection arrangement to the preferred nickel-cadmium cell 17. The assemblage of the circuit arrangement and the nickel-cadmium cell are off-set from the casing center and essentially take up the casing interior to just below and, as needed, can even extend into the arcuate shoulder 13 hollow portion of top 12, and leaving open the casing area below the blade slots 28a and 28b. Thereby, the casing will accommodate the insertion of blades 15a and 15b therein when the battery is in the configuration of FIG. 1.

FIG. 2 shows the battery configured as shown in FIG. 1, with the circuitry connecting the nickel-cadmium cell 17 to the positive and negative poles. In FIG. 4, the battery is configured as shown in FIG. 3, the blades 15a and 15b shown electrically connected to the charger circuit through contacts 26a and 26b. The preferred charging circuit is shown as: a capacitor 35 connected in series to bridge 18, with a varistor 36 and a resistor 37 connected in parallel to that circuit. This configuration provides protection against overvoltage and shock hazards. Such circuit is similar to a circuit shown in a standard work entitled "Eveready Battery Applications and Engineering Data", published by Union Carbide Corporation, 1965, on page 643, that is for use as a capacitance charging circuit for nickle-cadmium cells. Except that, prior to the present invention, that provides, as set out above, for disconnection of the battery base or negative pole when in the configuration of FIG. 3, such circuit could not effectively be used for safety reasons. The Eveready capacitor circuit, to function has to be connected to the secondary cell, and a bulky switch or breaker arrangement was formerly required to disconnect the battery negative pole during charging to avoid a hazard of electrical shock making it impractical for a use like the present invention. Such switch was both too large to fit within the space available and was prohibitably expensive. The present invention, eliminates a need for such switch by utilizing the blade 15a when the battery is configured as shown in FIG. 1 for making electrical contact between the conductor bar 27 and plate 27a, connecting the battery base or negative pole 19 to the nickel-cadmium cell for use as a voltage source to operate a device such as a flashlight, radio or the like. A fail safe coupling is thereby provided that is broken when the head 14 is reversed, as illustrated in FIG. 3, the blade 15a removed from contact between the conductor bar 27 and plate 27a, breaking that electrical connection to the base or negative pole and thereby prohibiting any possibility of dangerous electrical potential being present at that base when the blades are plugged into a standard electrical receptacle.

The capacitance circuit shown in FIGS. 2 and 4 has been commonly used for a constant charging current of approximately 2 to 100 milliamperes. In practice, a capacitor manufactured by IMB Electronic Products, number 1YA7C185K has been satisfactorily used as capacitor 35 in the circuit. The capacitor 35 is shown in series with diode bridge 18 and the secondary cell 17. Further, a high resistance resistor 37, that preferably has a value of approximately 225 k ohm, is shown in parallel to the charging circuit to provide a means of rapidly discharging the capacitor 35 when the circuit is disconnected from the alternating current source. Thus, the possibility of shock hazard to the user due to capacitor discharge after it is disconnected from the AC source is eliminated. Also, varistor 36 is shown in parallel to the charging circuit to provide protection to the diodes from high voltage surges that are common in a standard or house alternating current.

In FIG. 4, the circuit is shown in the charging mode and connects to one junction 18a of bridge 18 with the opposite bridge junction 18c connected through capacitor 35 to complete the circuit. Bridge 18 is shown as a diode bridge for providing a full wave rectification to direct current of an alternating current. In practice a commercially available discrete diodes or a diode bridge manufactured by Collmer Semiconducter identified as a B200 as been found to function satisfactorily. In practice, using a nickel-cadmium cell like one manufactured by General Electric Company identified as Cs, with described circuit connected through blades 15a and 15b to a standard 110 outlet, the circuit will provide approximately 90 milliamps, and will fully charge the nickel-cadmium cell in approximately 16 hours. At the 90 milliampere charging rate, there is no possibility of damage to the circuit or the secondary cell due to leaving the battery plugged into a house electrical receptacle indefinitely.

While hereinabove has been detailed the preferred arrangement of resistors, capacitors and bridge 18 for forming the capacitance charging circuit of the present invention, for connection to the described nickel-cadmium cell 17, to fit within the casing 11, as described, it should be understood that the components set out hereinabove as preferred are included for example only and that other values of resistors or capacitors and bridges of different manufacturers and design functioning as described and fitted similarly into casing 11 could be substituted therefore within the scope of this disclosure.

Hereinabove has been described a preferred arrangement of battery and recharger therefore of the present invention and the individual charging circuit and nickel-cadmium cell thereof. It should, however, be understood that the present disclosure is made by way of example only and that changes can be made thereto without departing from the subject matter coming within the scope of the following claims, which claims I regard as my invention.

I claim:

1. An integrated battery and recharger comprising, a casing having parallel top and bottom ends that are at right angles to a side wall, that includes a top and base for closing over said casing ends which top consists of an upstanding shoulder formed to have a flat upper surface between upstanding side walls that extend at right angles upwardly from a flat top surface; a rechargeable electrical storage cell means and circuitry for recharging said electrical storage cell means, both for assembly within said casing; a head to fit alongside and against said upstanding shoulder, which head includes parallel flat faces that are at right angles to and between an upstanding wall having opposite sides, which sides will each fit closely against said shoulder, said head including a positive pole in one face that extends outwardly therefrom, and a pair of electrically conductive blades arranged to extend parallel to one another from the opposite head face, projecting outwardly at a normal angle to said face; electrical connector means for coupling to contacts in said head for alternatively electrically connecting said positive pole to said electrical storage cell means, when one head side is positioned against said top upstanding shoulder or for connecting said pair of blades to pass electrical current to said circuitry for recharging said electrical storage cell means when said head is repositioned relative to said top with its other side positioned against said upstanding shoulder; and means for connecting a battery negative pole across said electrical storage cell means negative side and said positive pole to said electrical storage cell means positive side.

2. An integrated battery and recharger as recited in claim 1, wherein the casing is cylindrical and the top secured thereto is formed as a separate unit and connected thereto; and with the head fitted to the top, the battery will have the diameter and height of a standard "C" cell size battery, or larger.

3. An integrated battery and recharger as recited in claim 1, wherein the upstanding shoulder is arcuate in shape, presents a concave inner surface, and the head upstanding wall is essentially an ellipse having opposite curved sides, either side thereof to fit closely against said upstanding wall concave inner surface.

4. An integrated battery and recharger as recited in claim 1, wherein the head positive pole is centered in a face thereof relative to the head longitudinal axis and is off-set along the lateral axis thereof to one side of the head longitudinal axis proximate to an edge of said face; and the parallel blades that extend from the opposite head face are also off-set along the head face lateral axis to the other side of the head longitudinal axis to said positive pole to extend outwardly at a normal angle from said face proximate to a face edge.

5. An integrated battery and recharger as recited in claim 1, wherein the head includes holes formed strategically in said head faces to intersect, respectively, the positive pole and the individual blades secured to the opposite head faces; electrically conductive connectors fitted into selected holes for electrically coupling to said positive pole or individual blade; and the electrical conducter means are conductive pins arranged to extend at normal angles from the top, parallel to the upstanding shoulder, to fit into said holes to selectively electrically couple to said pole or individual blade, through each said conductor.

6. An integrated battery and recharger as recited in claim 5, wherein the electrically conductive pins are aligned and extend at spaced intervals along a line bisecting the casing top.

7. An integrated battery and recharger as recited in claim 1, wherein the top flat surface includes a depression for receiving the positive pole fitted therein and further includes, on either side thereof, slots for receiving the individual blades fitted therein.

8. An integrated battery and recharger as recited in claim 7 further including, in the casing base, an electrically conductive base to function as the battery negative pole; a conductive bar means arranged within said casing and connected to said electrically conductive base on one end and is positioned to be adjacent to one of the blade slots such that, when a blade is installed therein, it will contact said conductive bar means; and plate means connected electrically across the rechargeable electrical storage cell means and located proximate to said blade slot for contact with said blade installed therein, said blade to thereby complete an electrical connection between said plate means and said conductive bar.

9. An integrated battery and recharger as recited in claim 1, wherein the rechargeable electrical storage cell means is a nickel-cadmium cell.

10. An integrated battery and recharger as recited in claim 1, wherein the recharging circuitry is a capacitance circuit that includes a resistor arranged across a current source, in series with a capacitor that is series coupled to discrete diodes whereacross the rechargeable electrical storage cell means is connected.

11. An integrated battery and recharger as recited in claim 10, wherein the capacitor is one manufactured by IMB Electronic Products identified as 1YA7C185K.

12. An integrated battery and recharger as recited in claim 10, wherein the resistor is a 225 k ohm and the diode bridge is one manufactured by Collmer Semiconductor identifed as B200.

13. An integrated battery and recharger as recited in claim 1, further including means for releasably securing the head in coupled engagement to the casing top.

14. An integrated battery and recharger as recited in claim 13, wherein the head securing means is a snap arrangement that includes as a female portion of the snap a depression formed in the casing top that include a ring member for fitting within said depression and has a number of vertical sections formed of a resilient material secured at intervals around said ring member to extend above said top and are bent at the level of that top face upon themselves back into said depression to closely accomodate the positive post fitted therein as the male portion of said snap arrangement.

15. An integrated battery and recharger as recited in claim 14, wherein the positive post includes a groove formed around its circumference.

16. An integrated battery and recharger as recited in claim 13, wherein the securing means includes a detent arranged in one side of the head upstanding wall to extend therefrom that can be depressed into alignment with said head upstanding wall; and means to receive said detent end therein formed in said upstanding shoulder side whereagainst said head will rest.

17. An integrated battery and recharger as recited in claim 16 further including means for depressing said detent end when said head is fitted to or removed from its nesting engagement to said upstanding shoulder.

18. An integrated battery and recharger as recited in claim 1, further including forming the head ends to leave center remainder portions for receiving a person's fingers fitted thereunder.

* * * * *